Jan. 11, 1966  M. C. DOLAN  3,228,665

WATER PURIFICATION DEVICE

Filed Oct. 4, 1963

INVENTOR.

Melvin C. Dolan

United States Patent Office 3,228,665
Patented Jan. 11, 1966

3,228,665
WATER PURIFICATION DEVICE
Melvin C. Dolan, 108 Cal Ave. Space 66,
Barstow, Calif. 92311
Filed Oct. 4, 1963, Ser. No. 313,896
3 Claims. (Cl. 261—3)

This invention relates to filters and the like for catching and holding foreign particles.

It is an object of the present invention to provide an in-line screen kit which will be used for evaporative coolers to prevent clogging of the system.

Another object of the present invention is to provide an in-line screen which will collect and hold the loose wooden fibers which are washed down from the pad and into the water reservoir. Clogging occurs when the loose wooden fibers are washed down from the pad and into the water reservoir and are then picked up by the recirculating pump and are forced into the water distributor. These fibers cause clogging of one or more of the water distributor tubes, thus cutting down in varying degree the effectiveness of the pads which in turn lowers the cooling capacity of the entire cooler.

A further object of the present invention is to provide an in-line screen which will minimize the build up of minerals and algae in the cooler water reservoir. The mineral build up coats the pads and reduces cooling capacity and also attacks the paint in the cooler and the algae produces unpleasant odors. The in-line screen will incorporate a bleed-off tube to eliminate or minimize such conditions.

Other objects of the invention are to provide an in-line screen bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which.

Figure 1:
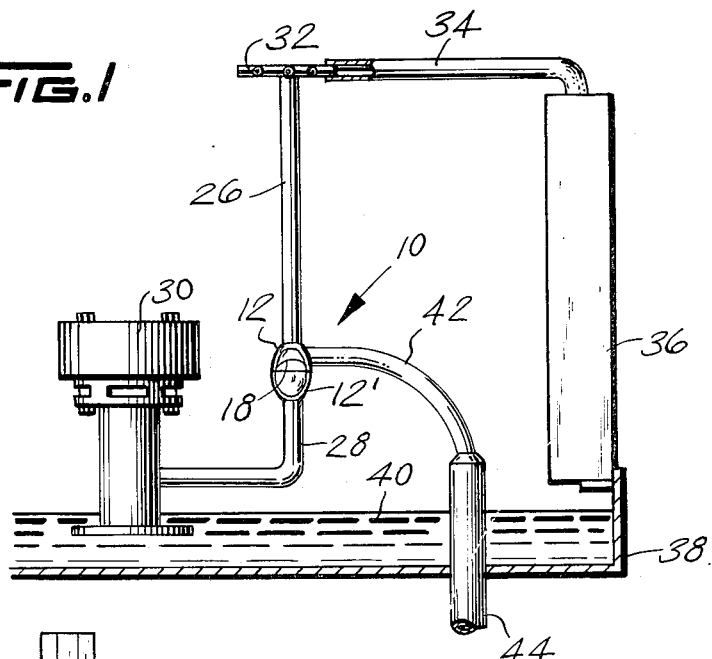
FIGURE 1 is a side view of the present invention shown in operative use.
Figure 2:
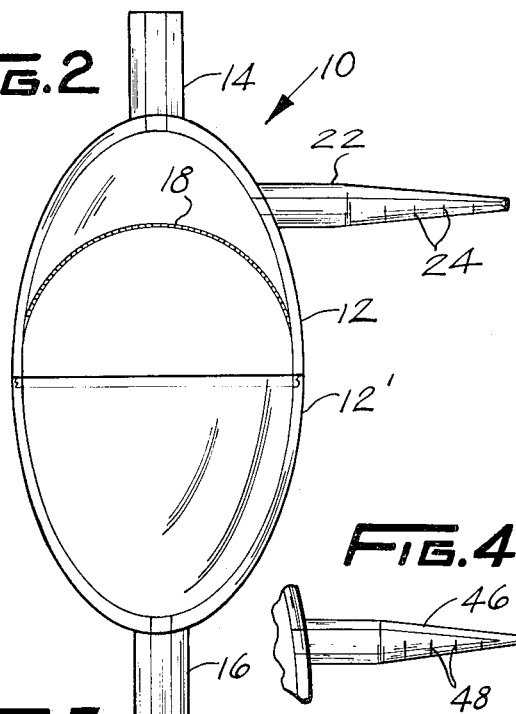
FIGURE 2 is an enlarged side view of the present invention shown in elevation and removed from FIGURE 1.
Figure 3:
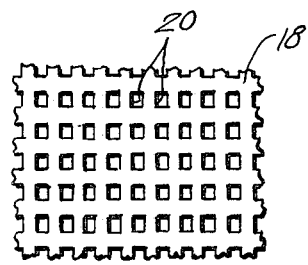
FIGURE 3 is a fragmentary plan view of the screen shown removed from the invention.

Referring now more in detail to the drawing, an in-line screen 10 made in accordance with the present invention is shown to include a pair of clear plastic shells 12 and 12' which form an elliptical container. Shell 12 and shell 12' are threaded so as to require a half turn rotation to secure them together or to separate them. A plastic screen 18 having a plurality of openings 20 is arcuately bent and fitted to the interior of shell 12 and thus provides a means for catching foreign particles, such as wood fibers and the like. The screen is retained in position by the outward pressure of the opposite edges of the screen against the shell interior. The upper parabolically configurated shell 12 has a clear plastic outlet tube 14 and the parabolically configurated shell 12' is provided with a clear plastic inlet tube 16 which aligns with outlet tube 14. A tapered bleedoff tube 22 is molded to shell 12 at right angles to the axis of outlet tube 14 and inlet tube 16 and is provided with a plurality of spaced apart graduations 24 which provide a useful means for cutting off bleedoff tube 22 at any desired bleedoff flow. The bleedoff tube thus serves as an outlet tube which dispenses a controlled volume of water in relation to time. Outlet tube 14 is received within pump hose 26 and inlet tube 16 is received by hose 28 which is secured to the recirculating pump 30. The upper end of pump hose 26 is received by water distributor 32 of spider-like configuration. A water distributor tube 34 is secured to water distributor 32 and is secured to the upper section of pad 36 which is in turn secured to cooler 38. Water 40 within cooler 38 is picked up in the well known manner by pump 30 and an overflow tube 42 is received over the bleedoff tube 22 at one end and at the other end is received by drain pipe 44.

The spider-like distributor 32 is adapted to be connected to conduits similar to conduit 34. These conduits supplying water to other evaporative coolers similar to cooler 36 are not shown.

In operation, water 40 enters inlet tube 16 of shell 12' from recirculating pump 30 and passes through screen 18 in shell 12 whereby it is filtered, thus preventing clogging of the system.

When screen 18 becomes clogged, shell 12 is rotated one-half turn, thus separating shell 12 from shell 12' in order that screen 18 may be cleaned of all foreign matter.

It shall be noted that bleedoff tube 22 is provided with a miniature opening on its tapered end for automatic bleedoff, and if desired may be cut along any one of the plurality of graduations 24 to provide further bleedoff.

Figure 4:
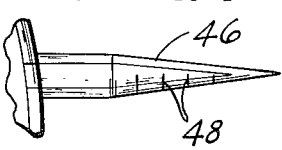
FIGURE 4 is a fragmentary side view of a modified bleedoff tube shown in elevation.

In FIGURE 4 a modified form of bleedoff 46 is shown to be tapered and closed at its pointed end and is provided with a plurality of spaced apart graduations 48 which may be the means for cutting off the tube 46 for the desired rate of flow.

Figure 5:
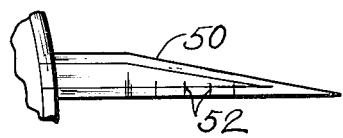
FIGURE 5 is a side view of another modified bleedoff tube shown in elevation.

In FIGURE 5 another modified form of bleedoff tube 50 is beveled to a point and is closed on its pointed end and is provided with a plurality of spaced apart graduations for cutting it off for a predetermined rate of flow.

While various changes may be made in the detail construction, it shall be understood that such changes shall be within the spirit and scope of the present invention as defined by the appended claims.

What I claim as new and desire to protect by Letters Patent of the United States is:

1. An in-line screen kit comprising in combination an ellipsoidal, transparent plastic body, a chamber within said body, an inlet tube and an outlet tube providing means for the entrance and exit respectively of water, a flat screen arcuately bent providing means for filtering wooden fibers and foreign particles from the water, said flat screen being received and frictionally secured within said body, and a bleedoff tube communicating with and providing a bleedoff from said chamber, an evaporative cooler having an inlet distributor hose, a spider-like distributor adapted to distribute water to multiple points and a water recirculation pump having an outlet hose, said spider-like distributor communicating with said body outlet tube and said cooler inlet distributor hose, and said pump outlet hose communicating with said body inlet tube, said water being introduced into said inlet tube of said body and directed toward the concave side of said arcuately bent screen.

2. The combination according to claim 1 wherein said body is composed of a pair of paraboloidal clear plastic shells, said shells being threaded at their openings to threadingly engage each other with a half turn of rotation, thus securing each to the other and forming said body, and one of said parapoloidal shells being provided with said screen, said screen having a plurality of openings therethrough for allowing the passage of water and said screen extending upwardly toward said outlet tube.

3. The combination according to claim 2 wherein said inlet tube and said outlet tube of said body are in alignment with each other and said bleedoff tube is molded into said upper shell containing said screen, and said bleedoff tube extends at right angles to the axis of said outlet tube and communicates with an overflow tube, and said bleedoff tube is provided with a miniature opening, said bleedoff being further provided with a plurality of perpendicularly transverse graduations, said tube having a tapered end and said graduations being on the periphery of said tapered end of said tube and said graduations providing a means for accurately cutting off said bleedoff for the desired rate of flow into said overflow tube.

References Cited by the Examiner

UNITED STATES PATENTS

| | | | |
|---|---|---|---|
| 190,569 | 5/1877 | Fleming et al. | 210—446 X |
| 263,614 | 8/1882 | Stafford | 210—446 X |
| 622,217 | 4/1899 | Fuller et al. | 210—445 |
| 2,704,544 | 3/1955 | Ryan | 210—448 X |
| 2,776,055 | 1/1957 | Adler | 210—445 X |
| 2,833,444 | 5/1958 | Sherbondy | 222—541 X |
| 2,847,835 | 8/1958 | Cooper et al. | 210—448 X |
| 2,981,449 | 4/1961 | Perkins | 222—541 |
| 3,034,772 | 5/1962 | Schulz | 261—100 X |
| 3,126,427 | 3/1964 | Broughton | 261—2 |

HARRY B. THORNTON, *Primary Examiner.*

RONALD R. WEAVER, *Examiner.*

T. R. MILES, D. M. RIESS, *Assistant Examiners.*